United States Patent [19]
Faris

[11] Patent Number: 5,165,013
[45] Date of Patent: Nov. 17, 1992

[54] 3-D STEREO PEN PLOTTER

[76] Inventor: Sadeg M. Faris, 24 Pocantico River Rd., Pleasantville, N.Y. 10570

[21] Appl. No.: 587,664

[22] Filed: Sep. 26, 1990

[51] Int. Cl.$^5$ ............................................. G06K 15/00
[52] U.S. Cl. .................................... 395/104; 395/119; 346/135.1
[58] Field of Search ............... 395/101, 103, 104, 119, 395/120; 353/8; 352/60, 57, 58; 346/134, 139 R, 139 C, 135.1, 140 R, 136; 250/558; 356/2

[56] References Cited

U.S. PATENT DOCUMENTS

| | | | |
|---|---|---|---|
| 2,623,433 | 12/1952 | Stipek | 350/132 |
| 3,659,939 | 5/1972 | Hobrough | 250/558 |
| 4,746,936 | 5/1988 | Takahashi | 346/140 R |

*Primary Examiner*—Arthur G. Evans

[57] ABSTRACT

A pen plotter capable of producing large 3-D stereo plots is described. The operating principles is based on micro-polarizer arrays and spatial multiplexing. Because of the vector based plotting and the continuous transfer of the ink from the pen to the paper, previous methods for making 3-D stereo printing cannot be used. Instead, a new "pixel skipping pen" and paper combination are devised which exploit the fact that water and oil do not mix. Dedicating oil-based inks for plotting the right perspectives on hydrophobic coating on the plotter paper, while water-based inks for plotting the left perspectives on hydrophilic coating, makes it possible to achieve 3-D stereo plotting with automatic registration on a single component 3-D plotting paper. Two other kinds of 3-D plotting papers are devised which use two and three specially treated sheets that are registered with pins.

12 Claims, 5 Drawing Sheets

3-D STEREO PEN PLOTTER

BACKGROUND OF THE INVENTION

1. Field of the Invention

This invention relates in general to the field of computer hard copy output devices. In particular it relates to pen plotters used to provide hardcopies for computer aided design, drafting and graphics.

2. Description of Related Art

All living creatures are endowed with a pair of eyes for 3-D stereoscopic vision. They have depended on this vision for their survival. Yet, in spite of the tremendous advances in information technology, there is no prior art teaching how to obtain hardcopy outputs from computers in the form of 3-D stereo plots. My co-pending application Ser. No. 7/554,742 teaches methods for producing 3-D stereo computer printers based on the micro-polarizer arrays and spatial multiplexing principles described in my co-pending applications Ser. No. 7/536,190, and Ser. No. 7/536,419. However, because pen plotters depend on the continuous transfer of ink from the pen onto the paper, the 3-D stereo printer operating principles described in Ser. No. 7/554,742 will not work for pen plotters. Therefore, there remains a need for generating large 3-D stereo plots for architectural and mechanical designs for which pen plotters are particularly suited.

SUMMARY OF THE INVENTION

The principal object of the present invention is to provide a 3-D stereo pen plotter which is based on micro-polarizer arrays ($\mu$Pol) and spatial multiplexing. It comprises:

Means for manufacturing a special plotting paper having self-aligned features of the spatially multiplexed image with respect to the $\mu$Pol. This plotting paper is based on the fact that water and oil do not mix and on the use of hydrophobic and hydrophillic coatings; and Novel pen design which, even though continuously presses on the plotting paper, it plots only in the space intended for one perspective image, while skipping the space of the other perspective, to be filled with a different pen.

DETAILED DESCRIPTION OF THE PREFERRED EMBODIMENTS

Figure 1A:
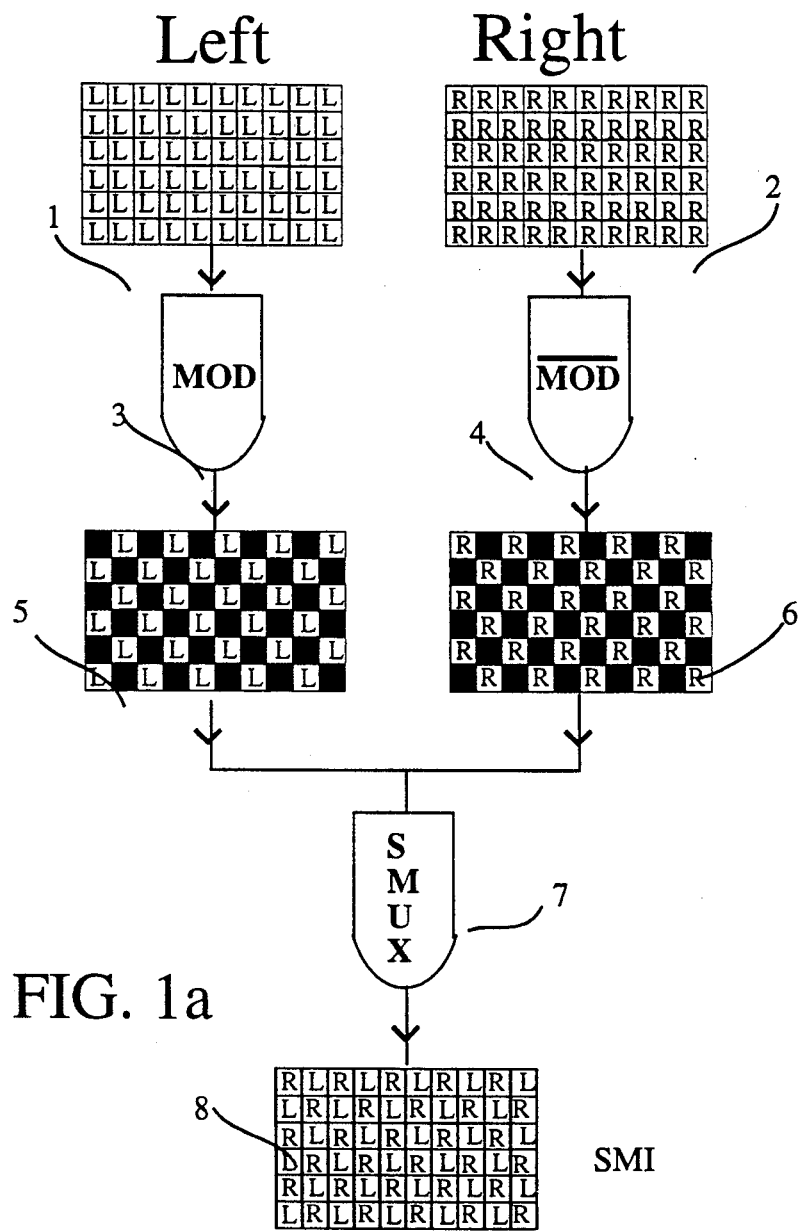
FIG. 1a illustrates the principles behind the stereo plotter, spatial modulation and spatial multiplexing of the left and right images.
Figure 1B:
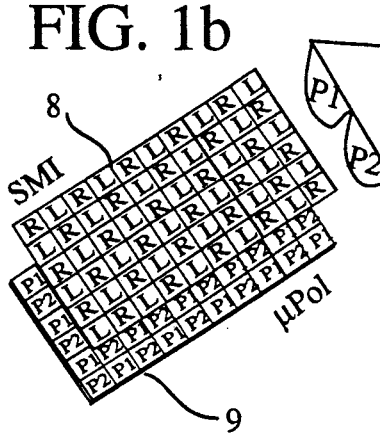
FIGS. 1b and 1c illustrate the use of micropolarizer sheets for demultiplexing and stereo viewing of the printed image by means of polarized spectacles.
Figure 1C:
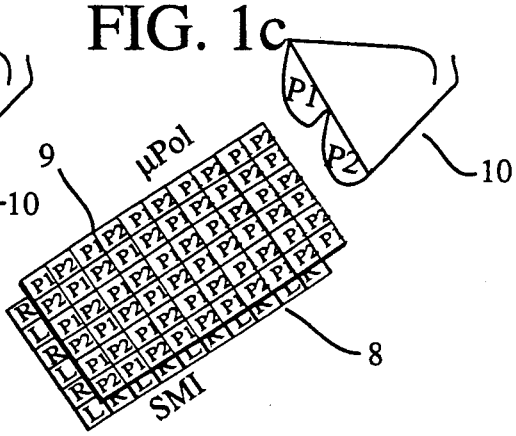

The invention is based on two fundamentally new concepts combined for the first time to record and display 3-D images. They are: Spatial Multiplexing of left and right images and Micro-Polarizers. These are described in my co-pending applications: "A System For Producing 3-D Stereo Images", Ser. No. 536,190, and "Methods For Manufacturing Micropolarizers", Ser. No. 536,419. FIG. 1a illustrates the spatial multiplexing principles. The data representing the left and right images are stored in a bit map format (other formats may also be used) in left memory array 1 (L-RAM), and right memory array 2 (R-RAM) respectively. Each pixel in the array has N-bits for color and gray-scale. Using a spatial checkerboard modulator MOD 3, the left image 1 is modulated and stored in the array 5. The right image is spatially modulated using the compliment of MOD 4 to produce the compliment pattern stored in array 6. The modulated images 5 and 6 are combined (multiplexed) using a spatial multiplexer 7 and the spatially multiplexed image (SMI) is stored in the array 8. The SMI 8 shows a combined left and right images side by side on a pixel by pixel basis and therefore caries the stereo information. The flow diagram of FIG. 1a is an algorithm to produce the SMI which can be implemented either in hardware or in software. In FIG. 1b the SMI 8 is combined with a spatial demultiplexer 9, a micropolarizer, $\mu$Pol sheet described in applications Ser. Nos. 536,190, and 536,419 and a polarization decoder 10, a pair of spectacles with polarization states P1 and P2. The SMI and the $\mu$Pol arrays 9 which have the same period are aligned such that the left pixels in the SMI illuminate the P2 cells in the $\mu$Pol array and the right pixels illuminate the P1 cells. Thus, the left pixels become P2 polarized and the right pixels become P1 polarized. Because of the discriminating ability of the polarized eye glasses, the left eye which has a P2 polarizer can seen only the P2-polarized left pixels, and the right eye which has a P1 polarizer can see only the P1-polarized right pixels. To achieve the 3-D stereo sensation the human brain fuses the left and right images in the same manner it deals with natural 3-D scenes. FIG. 1c shows that the SMI 8 may also be placed top of the $\mu$Pol. Choosing between the configurations of FIG. 1b and FIG. 1c depends on how the SMI is illuminated, and whether the transmissive mode or reflective mode of display is used; see Ser. No. 536,190.

Figure 2:
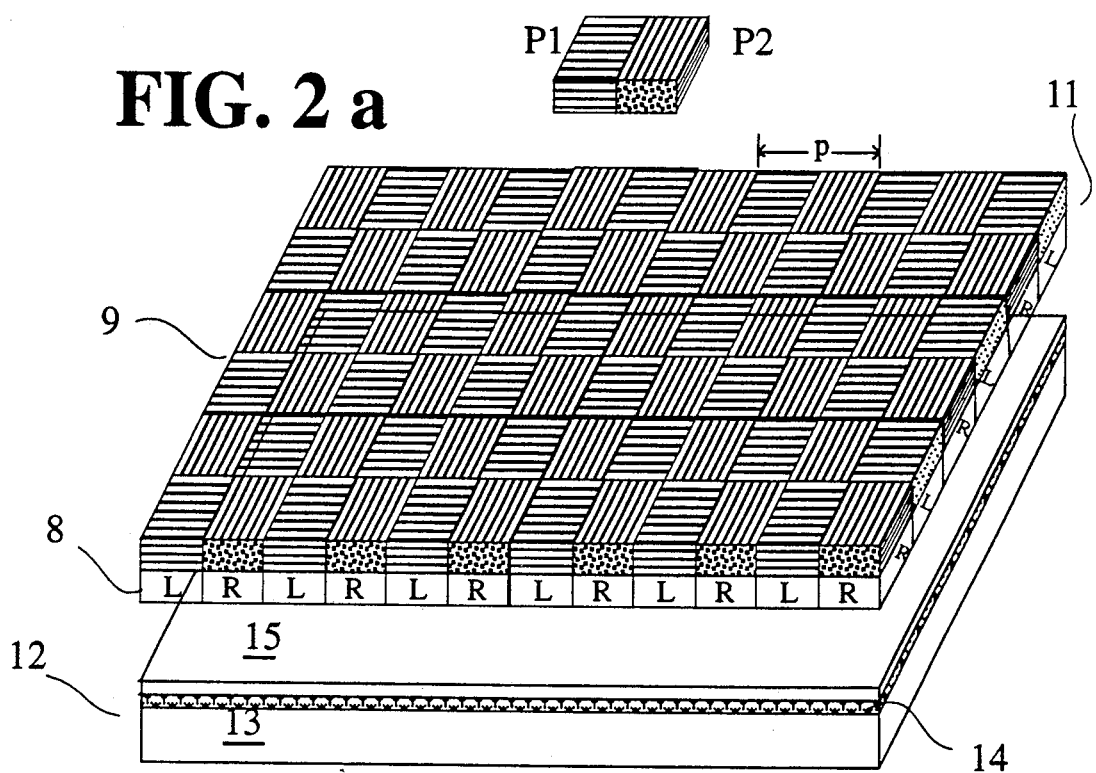
FIGS. 2a-c show the 3-D stereo plot made of laminating a plotted micropolarizer sheet with a polarization preserving aluminum coated paper.
Figure 2:
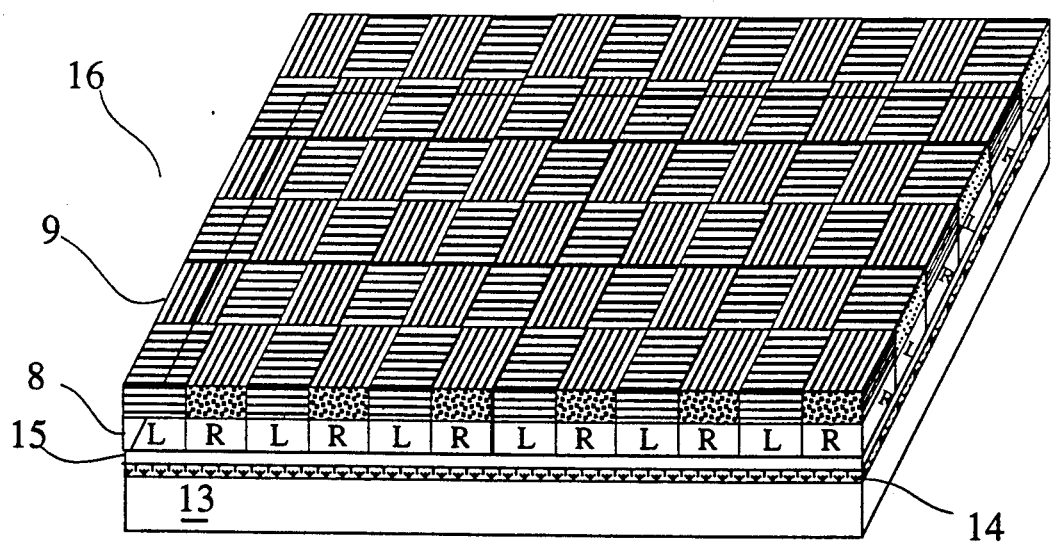
Figure 2:
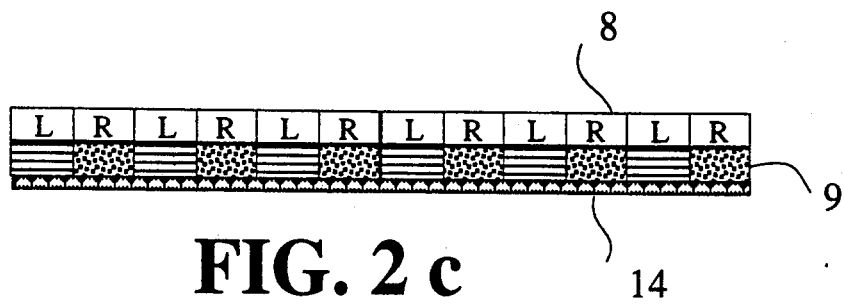

To build a hardcopy plotter to output images from computers in stereo the above concept is used in conjunction with the principles taught in the embodiments described here. FIGS. 2a and 2b show how the final desired hardcopy stereo output is obtained. It comprises two sheets 11 and 12 laminated together to produce the output plot 16. The first sheet 11 is a $\mu$Pol 9 on which the SMI 8 is plotted after proper alignment is ensured. The second sheet 12 consists of regular paper 13, coated with aluminum or silver flakes 14 and a clear adhesive layer 15. The aluminum or silver layer is needed to preserve the polarization and maximize the brightness. If paper only was used in 13, the polarized light striking its surface becomes depolarized and as it emerges from the $\mu$Pol layer its brightness is reduced by at least 50%. FIG. 2c shows another simpler embodiment which eliminates the sheet 12 but achieves the same result by directly coating the back of the $\mu$Pol 9 with a silver or aluminum film 14.

There are two classes of polarizer polymers; the absorptive class such as polyvinyl alcohol, PVA, and the reflective class such as cholesteric liquid crystal silicone, CLCS (see Robert Maurer et al, Society of Information Display SID 90 Digest, p. 110, 1990, and Martin Schadt, and Jurg Funfschilling, SID 90 Digest, p. 324, 1990). The absorptive class converts unpolarized light to linearly polarized light of state P1 by absorbing the orthogonal state P2. This absorbed light energy is converted to heat and is lost for ever. The polyvinyl alcohol, PVA, used to construct the μPols in Ser. Nos. 536,190, and 536,419 belongs to the absorptive class. Hard copies based on the absorptive class, in general, lose at least 50% of the illuminating light. The reflective class separates the incident unpolarized light into two circularly polarized states P1 and P2, one state P1 is transmitted and the other state P2 is reflected. In this case no light energy is lost to heat and therefore it is possible to convert 100% of the incident light into polarized light with the desired state of polarization. This is done by coating a sheet of CLCS with a reflective metallic film on one side, and illuminating it on the other side with unpolarized light. 50% of this light is reflected as P1, and the other 50% is transmitted as P2. This P2 light is then reflected by the metallic layer and converted into P1 (it is well known in the field of optics that a circularly polarized light of one state is converted to the orthogonal state as a result of reflection), thus all the incident light is converted to polarized light of state P1. This reflective class of polarizers when used to fabricate μPols, provides at least a factor of 2 brighter 3-D stereo plots than the absorptive class.

Figure 3:
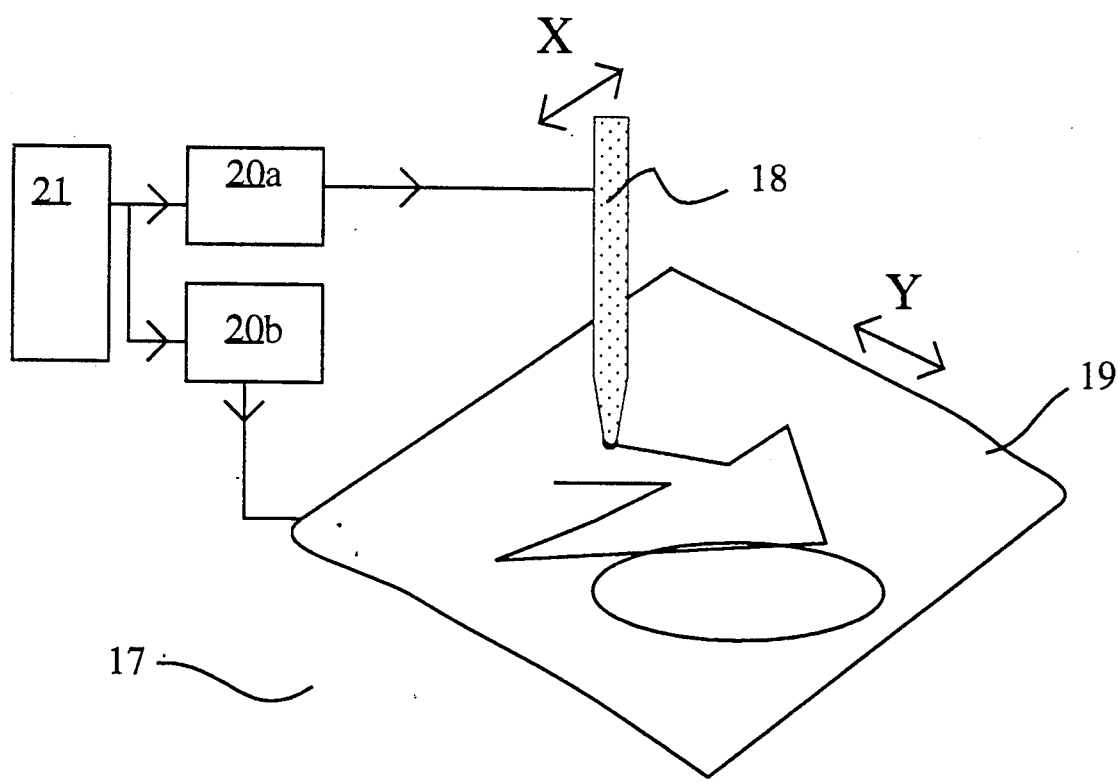
FIG. 3 shows the schematically the components of a pen plotter.

FIG. 3 illustrates schematically a pen plotter 17. Its main components are: the pen 18 which can be moved in the positive and negative X directions by means of an electromechanical X motion controller 20a; the paper 19 which can be moved in the positive and negative Y directions by means of an electromechanical Y motion controller 20b, and the computer 21. The computer translates the image to be plotted to vector quantities, and supplying the X and Y coordinates to the X and Y motion controllers relative to an initial position. Typical plotters also include a pen cartridge which holds 8 pens of different colors each of which is activated in turn for plotting. The main advantage of plotters over printers, is their ability to produce extremely wide and long plots. However, because conventional pen plotting is based on continuous ink transfer from an initial potion to a final position, spatial multiplexing of images is not possible unless a "pixel skipping pen" is found.

Figure 4A:
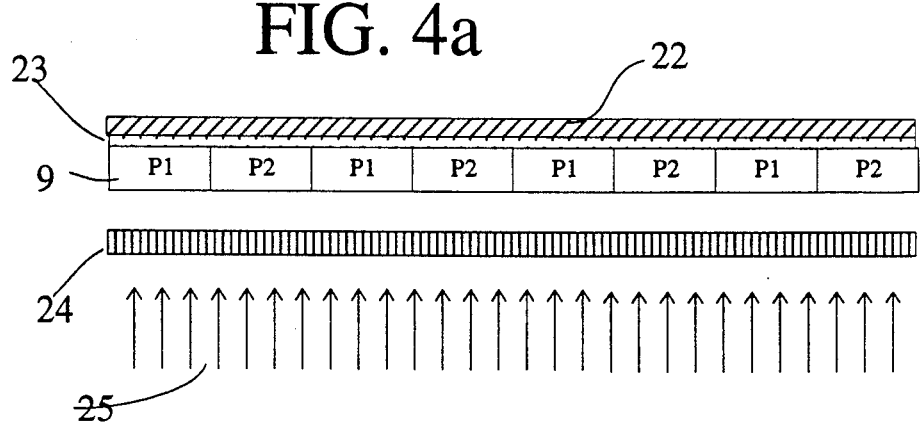
FIGS. 4a-c illustrate the manufacturing steps for producing a self-aligned $\mu$Pol plotting paper.
Figure 4B:
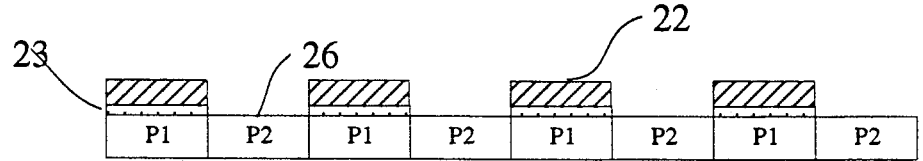
Figure 4C:
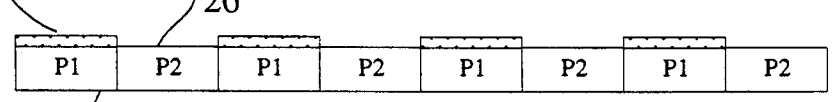
Figure 5:
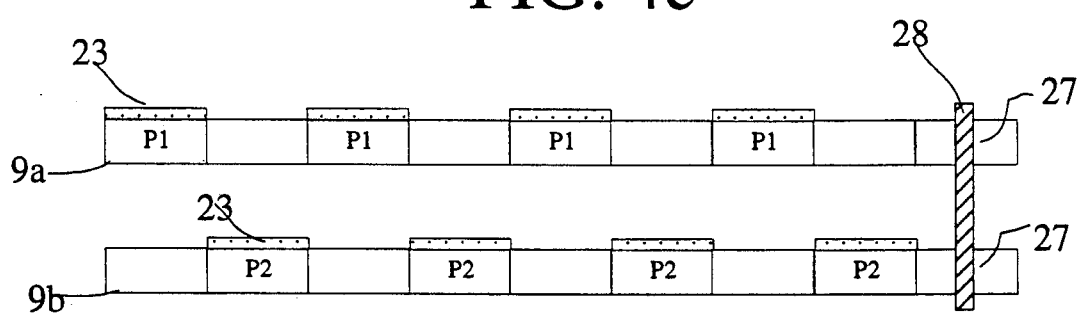
FIG. 5 shows another plotting paper embodiment which is based on 2 components and registration pins.
Figure 6:
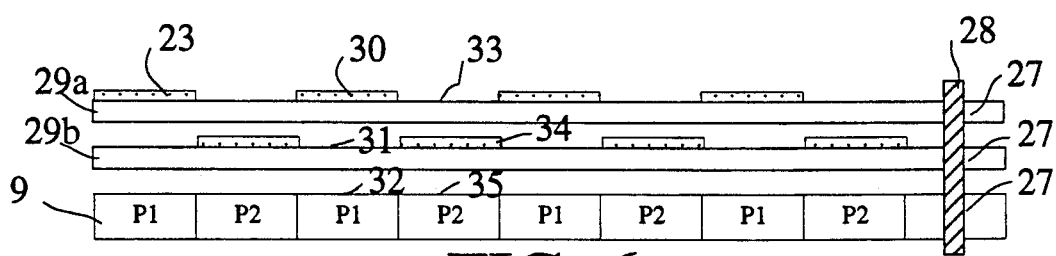
FIG. 6 shows a third plotting paper embodiment which is based on 3 components and registration pins.

The "pixel skipping pen" concept is implemented by means of a special plotting paper manufactured according to the self-aligned process shown in FIG. 4. The μPol sheet 9 (FIG. 4a) is coated with a hydrophobic layer 23 (an oil based coating which repels water, similar to the coating used in making offset printing plates) and a photoresist layer 22. The laminate is exposed with a light source 25 through a sheet polarizer 24 with polarization state P2. The photoresist covering the P1 parts of the μPol 9 are not exposed by the P2 polarized light because the P1 parts do not transmit the P2 state. On the other hand the photoresist covering the P2 parts of the μPol 9 are exposed by the P2 polarized light because the P2 parts do transmit the P2 state. The next step FIG. 4b, is to develop the photoresist and chemically etch away the hydrophobic coating 23, leaving the P2 parts 26 of μPol 9 exposed. These exposed parts are hydrophilic, i.e., they attract water. The final step FIG. 4c is the removal of the photoresist, producing the final 3-D plotting paper. FIG. 5 shows a second method for producing a 3-D plotting paper using two components 9a and 9b. These components are registered by means of registrations pins 28 going through the registration holes 27. The pins and holes are located in a least two locations in both 9a and 9b. The patterning of the coating 23 on 9a is accomplished by the same self-alignment method described in FIG. 4. The patterning of the coating 23 on 9a is also accomplished by the same self-alignment method described in FIG. 4, except for replacing the sheet polarizer P2 with a sheet polarizer P1. FIG. 6 shows yet a third method for producing a 3-D plotting paper using three components: clear plastic films 29a, 29b, and a μPol sheet 9. These components are registered by means of registrations pins 28 going through the registration holes 27. The pins and holes are located in a least two locations in 9, 29a, and 29b. The patterning of the coating 23 on 29a is accomplished by the same self-alignment method described in FIG. 4. The patterning of the coating 23 on 29b is also accomplished by the same self-alignment method described in FIG. 4 except for replacing the sheet polarizer P2 with a sheet polarizer P1.

Figure 7A:
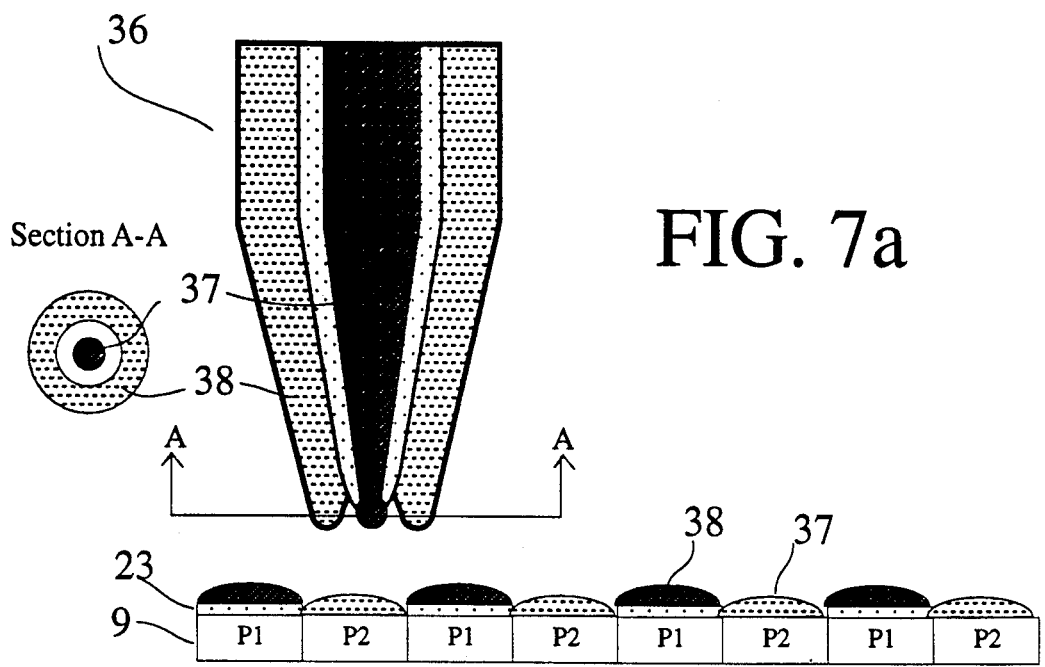
FIGS. 7A-B illustrate the special "pixel skipping" pens and their use in producing plots on a single component $\mu$Pol 3-D plotting paper.
Figure 7B:
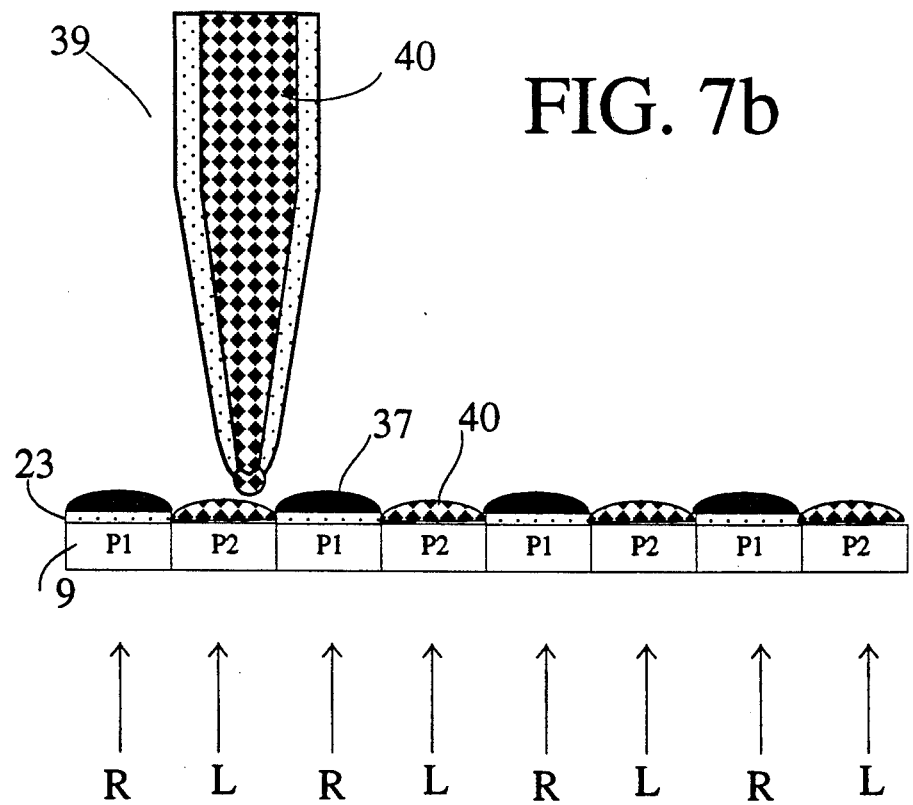

3-D stereo plotting is demonstrated in FIG. 7a, using the single component plotting paper produced by the process described in FIG. 4, and a special pen design 36. The pen 36 has an oil-based ink 37 surrounded by a clear water based liquid 38. The purpose of the water-based liquid is to wet the hydrophilic regions on the P2 parts of μPol 9 before they are contacted by the center oil-based ink 37, making the water-wetted P2 parts forbidden to the oil ink. In the mean time, the coating 23 covering the P1 parts is hydrophobic, it repels the water-based liquid 38 and attracts the oil-based ink 37. The overall result is a pen that plots the P1 parts and skips the P2 parts. In order to achieve spatial multiplexing, the oil-based "pixel skipping pen" 36 plots only the right image on the P1 parts. In FIG. 7b, another water-based ink pen 39 is used to plot the left image only on the hydrophilic P2 parts while skipping the hydrophobic P1 pixels. Thus spatial multiplexing of the left and right perspectives is completed using pen plotting with automatic registration.

The second and third 3-D plotting papers in FIG. 5 and FIG. 6 do not require the special pen 36, instead, they use regular pens with either water-based inks or oil-based-inks. However, in this case plotting one perspective requires the removal of one layer, and then putting it back for plotting the second perspective. The registration pins 28 ensure proper alignment all the time.

What is claimed is:

1. A pen plotting system for producing 3-D stereo plots comprising:
   one or more pixel skipping pens,
   μPol based 3-D plotting paper,
   means for spatial multiplexing of left and right perspectives by pixel skipping with said pens, and said μPol based 3-D plotting paper and
   means for controlling the motion of the pen and plotting paper to produce vector coordinates which represent the plotted image.

2. A pen plotting system for producing 3-D stereo plots according to claim 1, wherein the pixel skipping pens has an ink material which plots the image of one perspective in its pixel locations while skipping the adjacent pixel locations of the other perspective.

3. A pen plotting system for producing 3-D stereo plots according to claim 1, wherein the pixel skipping pens are made of a center ink reservoir connected to a writing tip, surrounded by a water-based liquid reservoir with an annular writing tip. The ink material is chosen to be hydrophobic and does not mix with water. Upon plotting, the pen transfers simultaneously both the ink and the water-based liquid to the plotting paper.

4. A pen plotting system for producing 3-D stereo plots according to claim 1, wherein 3-D plotting paper is made of a $\mu$Pol sheet of polarization states P1 and P2, with P1 cells covered by a hydrophobic film coating and the P2 cells covered by a hydrophilic film coating.

5. A pen plotting system for producing 3-D stereo plots according to claim 1, wherein 3-D plotting paper is made of two micro-polarizer array sheets. The first has P1 cells separated by clear regions and the P1 cells are covered by a hydrophobic film coating. The second sheet has P2 cells separated by clear regions and the P2 regions covered by a hydrophobic film coating. The two sheets are kept in registration by means of at least two pins connecting them such that the P1 parts of the first sheet overlap the clear parts of the second.

6. A pen plotting system for producing 3-D stereo plots according to claim 1, wherein 3-D plotting paper is made of a $\mu$Pol sheet and two clear sheets. Each clear sheet is covered with a regular array of hydrophobic film coating separated by an array of clear regions. The three sheets are kept in registration by means of at least two pins connecting them such that the P1 parts of the $\mu$Pol are overlapped with the hydrophobic film coating of the first clear sheet, and the P2 parts are overlapped by the hydrophobic film coating of the second clear sheet.

7. A system for producing 3-D stereo images comprising:
   means for generating a stereo pair of images representing the left and right perspectives,
   a plotting medium which is divided into first and second arrays of microscopic regions wherein each region of said first array is positioned next to a region of second array, and regions of first array are receptive only to ink carrying information of left perspective, while regions of second array are receptive only to ink carrying information from the right perspective, and further, when illuminated, the first and second arrays give images with a distinct optical code for each,
   a first pen actuated to deliver ink representing the left perspective only to the regions of first array;
   a second pen actuated to deliver ink representing the right perspective only to the regions of second array, and
   means for viewers eyes to decode the plotted images such that the left eye sees only the left perspective while the right eye sees only the right perspective.

8. A system for producing 3-D stereo images according to claim 7 wherein the medium is a micropolarizer array having two spatially alternating polarization states P1 and P2 and the regions having polarization state P1 are receptive only to ink from the left perspective, while the region having polarization state P2 are receptive only to ink from the right perspective.

9. A system for producing 3-D stereo images according to claim 7 wherein the surfaces of the regions of the first array are treated to attract one kind of ink, representing a first image, which bonds to said surfaces, while the surfaces of regions of the second array are treated to attract a second kind of ink, representing a second image, which bonds to said surfaces.

10. A system for producing 3-D stereo images according to claim 7 wherein the surfaces of the regions of the first array are hydrophilic, while the surfaces of the regions of the second array are hydrophobic.

11. A system for producing 3-D stereo images according to claim 7 wherein the first and second arrays are on the same substrate.

12. A system for producing 3-D stereo images according to claim 7 wherein the first and second arrays are on separate substrates and are in full registration.

* * * * *